United States Patent [19]
Debeaux et al.

[11] Patent Number: 5,524,160
[45] Date of Patent: Jun. 4, 1996

[54] ENGAGING FIBER-OPTIC PLUG CONNECTOR, IN PARTICULAR OVERMOLDED MONOBLOC PLUG

[75] Inventors: Alain Debeaux, Catenay Malabry; Jean-Francois Ollivier, Merdrignac; Jean-Jacques Crosnier, Fontenay Aux Roses, all of France

[73] Assignee: Framatome Connectors International, Courbevoie, France

[21] Appl. No.: 402,775

[22] Filed: Mar. 9, 1995

Related U.S. Application Data

[63] Continuation of Ser. No. 132,478, Oct. 6, 1993, abandoned.

[30] Foreign Application Priority Data

Oct. 9, 1992 [FR] France ........................... 9212015

[51] Int. Cl.⁶ ........................................... G02B 6/36
[52] U.S. Cl. .................... 385/92; 385/76; 385/93
[58] Field of Search ......................... 385/53, 56, 58, 385/76, 92, 139, 60, 77, 88; 439/369, 350, 353, 357, 358

[56] References Cited

U.S. PATENT DOCUMENTS

| | | | |
|---|---|---|---|
| 4,010,998 | 3/1977 | Tolnar, Jr. et al. | 439/358 |
| 4,291,943 | 9/1981 | Binek et al. | 385/58 |
| 4,411,491 | 10/1983 | Larkin et al. | 350/96.21 |
| 4,744,629 | 5/1988 | Bertoglio et al. | 350/96.20 |
| 4,747,656 | 5/1988 | Miyahara et al. | 350/96 |
| 4,762,388 | 8/1988 | Tanaka et al. | 385/58 |
| 4,779,950 | 10/1988 | Williams | 350/96.21 |
| 4,988,160 | 1/1991 | Luettgert et al. | 385/58 |
| 5,039,456 | 8/1991 | Bowen et al. | 385/56 |
| 5,097,523 | 3/1992 | Marie | 385/59 |
| 5,101,463 | 3/1992 | Cubukeiyan et al. | 385/72 |
| 5,230,032 | 7/1993 | Muzslay | 385/56 |
| 5,233,674 | 8/1993 | Vladic | 385/58 |

FOREIGN PATENT DOCUMENTS

| | | | |
|---|---|---|---|
| 1640411 | 5/1970 | Germany | 439/357 |
| 2312015 | 7/1982 | Germany . | |
| 3118489 | 11/1982 | Germany . | |
| 3522152 | 1/1986 | Germany . | |
| 3539988A1 | 5/1987 | Germany | H01R 13/627 |
| 58-145907 | 8/1985 | Japan | 385/56 |
| 2025649 | 1/1980 | United Kingdom | G02B 7/26 |

*Primary Examiner*—Akm E. Ullah
*Assistant Examiner*—John Ngo
*Attorney, Agent, or Firm*—Perman & Green

[57] ABSTRACT

This plug (200) is intended to interact with a mating connector or other female connection element comprising a tubular housing (103) provided with two diametrically opposite studs (109) for engaging and locking. According to the invention, the plug comprises: an elongate central body (210) accommodating the fiber termination (211, 212) with a cylindrical region (250) whose external section corresponds with the internal section of the housing of the mating connection, and two elastically deformable arms (220), each connected by one (222) of their ends to a rear region (218) of the central body and extending in along the central body substantially parallel to the general axis of the latter and toward the respective studs of the mating connector, the free end (223) of each arm each carrying a flange (230) provided, on its face turned toward the central body, with a cavity (231) of cross-section at least partially corresponding with the external section of the respective stud of the mating connector.

13 Claims, 2 Drawing Sheets

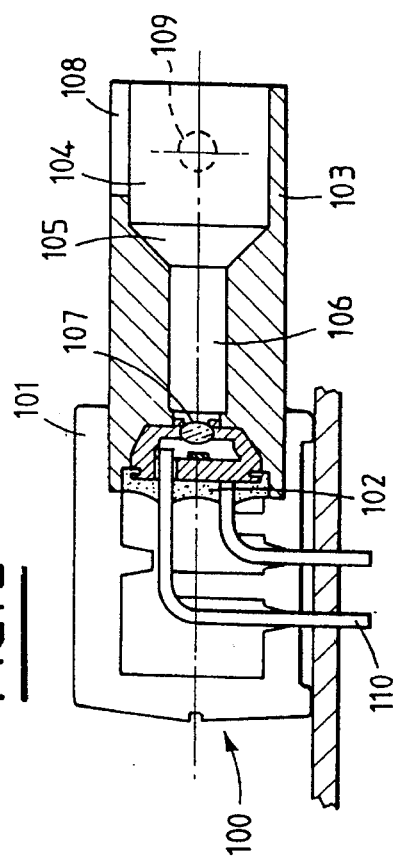
FIG. 1
FIG. 2
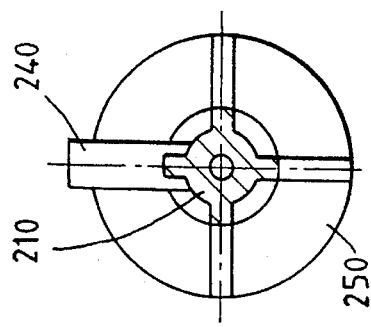
FIG. 7
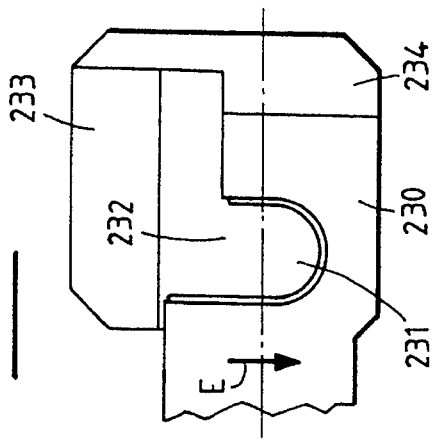
FIG. 6
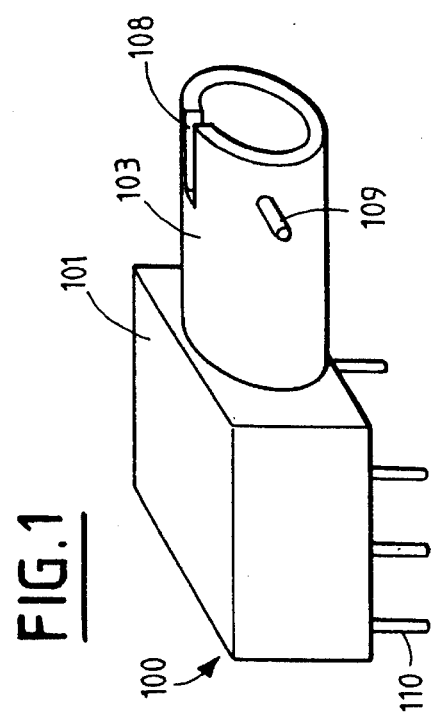
FIG. 5

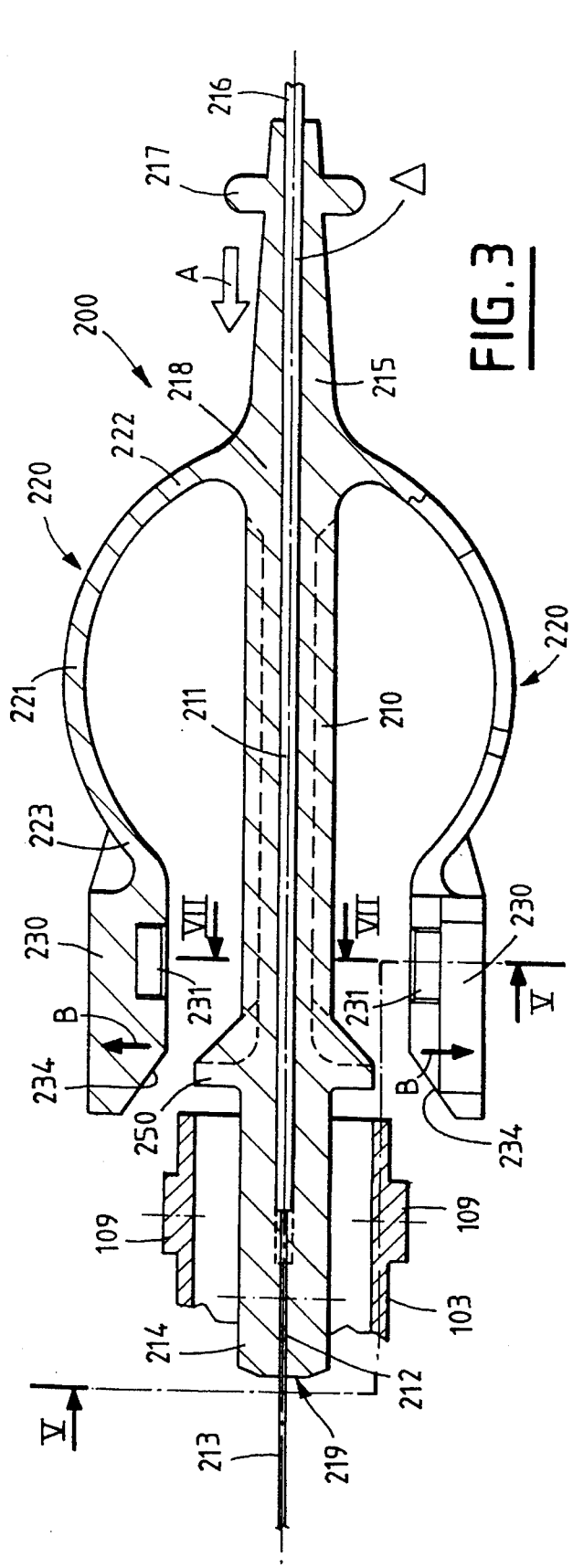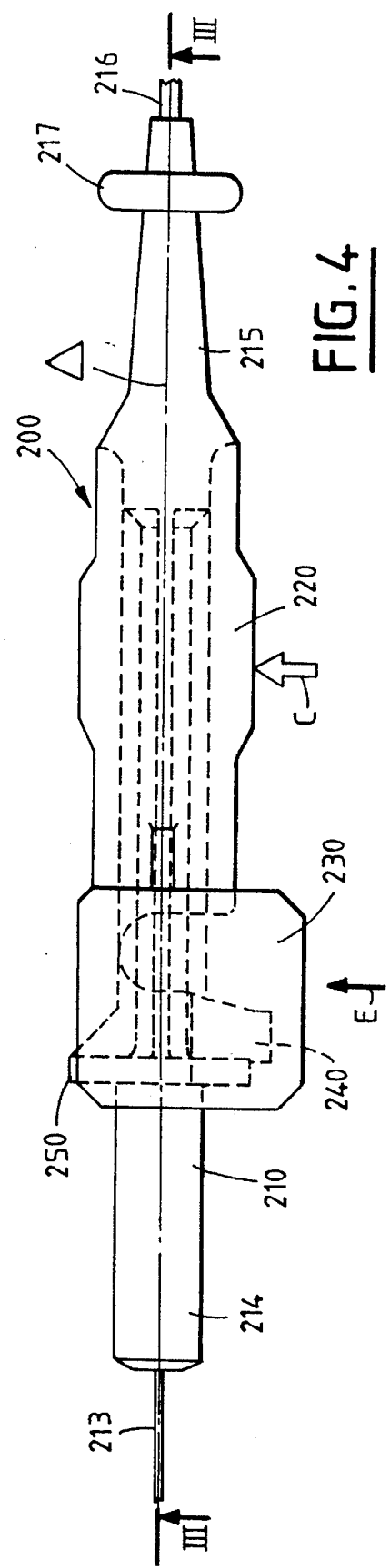

5,524,160

ENGAGING FIBER-OPTIC PLUG CONNECTOR, IN PARTICULAR OVERMOLDED MONOBLOC PLUG

This is a continuation of application Ser. No. 08/132,478 filed on Oct. 6, 1993 abandoned.

BACKGROUND OF THE INVENTION

The invention relates to a fiber-optic plug connector, intended to interact with a mating connector or with another female connection element such as, for example, a coupler intended to form the junction between two plugs placed face to face.

The mating connector may equally well be a passive mating connector, that is to say one containing only optical elements, or an active mating connector, that is to say one containing an electrooptical component, photoemitter or photodetector, used for converting the optical signal transmitted by the optical fiber into an electrical signal, or vice versa.

In general, these plugs are made in the form of a composite unit formed by several assembled pieces, with a dismountable metal body (for allowing the fiber to be fitted) and a rapid locking system of the bayonet or quarter-turn ring type (for allowing the plug to be locked onto the mating connector, the latter actually being provided with corresponding studs used for this locking). Furthermore, it is necessary for the fiber to be held axially in pressure against the element with which it is to be coupled (for example against the lens of the electrooptical component), and the plug comprises for this purpose an incorporated spring system allowing this axial pressure force to be exerted permanently once the plug has been fitted and locked onto the mating connector.

This construction of the plug in several parts, with its system for mounting the fiber, its metal casing, its locking ring, its spring system, etc., although ensuring excellent holding of the plug on the mating connector, is nevertheless complex and therefore expensive to produce.

It is very well suited when it is necessary to produce connections with a very high safety level (measurement appliances, devices located in an industrial environment, for example), or which must make it possible to carry out a very large number of connection/disconnection operations in a reliable manner.

In the case of mass-produced devices, where the unit cost price of the connection unit is an essential factor, it greatly increases the costs, however and even becomes prohibitive for many applications, where plugs which can be produced in a large number and at a very low price might be desired.

One of the objects of the invention is to overcome the limitations of plugs of the prior art, by providing a fiber-optic plug connector which can be engaged on a mating connector, which can be mass produced at a very low cost, highly advantageously in the form of a monobloc element made of plastic directly molded over the fiber termination to be equipped.

SUMMARY OF THE INVENTION

For this purpose, the plug connector of the invention, which is of the aforementioned type, that is to say intended to interact with a mating connector or other female connection element comprising a tubular housing receiving the fiber termination and provided with two diametrically opposite peripheral studs interacting with corresponding members of the plug in order to allow engaging and locking of the latter onto the mating connector, comprises a monobloc plug body having an elongate central body accommodating the fiber termination with a cylindrical region whose external section corresponds with the internal section of the tubular housing of the mating connector, and two elastically deformable arms, each connected by one of their ends to a rear region of the central body and extending in their entirety along the central body substantially parallel to the general axis of the latter and toward the respective studs of the mating connector, the free end of each arm each carrying a flange provided, on its face turned toward the central body, with a cavity of cross-section at least partially corresponding with the external section of the respective stud of the mating connector.

Preferably, the cavity is open laterally in a direction approximately perpendicular to the overall plane containing the body and the arms, so as to allow unlocking of the plug by elastic deformation moving the flanges in the aforementioned direction and essentially without relative radial separation of the arms with respect to the body.

Also preferably, the arms have, with respect to their point of junction to the body, a greater elasticity in the direction of a radial separation in said overall plane than in a direction perpendicular to this plane.

Advantageously, the elastic deformation of the arms is such that, after insertion and engaging of the plug in the mating connector, they exert by reaction on the central body an axial force holding the terminal end of the fiber in pressure against the corresponding optical element of the mating connector.

Highly advantageously, all the parts constituting the plug constitute a molded monobloc unit, in particular a unit molded directly over the fiber termination.

Other features and advantages of the invention will emerge on reading the following detailed description which is made with reference to the attached drawings.

DESCRIPTION OF THE DRAWINGS

FIGS. 1 and 2 show, respectively in isometric projection and in top view, in section, a mating connector into which the plug according to the invention is intended to be inserted, this mating connector being itself of a known type.

FIG. 3 is a plan view, partially in section, of the plug of the invention and of the front part of the mating connector into which it comes to be placed, taken along the line III—III of FIG. 4.

FIG. 4 is a side view of this same plug.

FIG. 5 is a front view, partially in section, taken along the line V—V of this same plug.

FIG. 6 represents a detail, seen along VI—VI of FIG. 5, of the internal face of one of the flanges of the plug.

FIG. 7 is a section, taken along VII—VII of FIG. 3, of the central body of the plug.

DETAILED DESCRIPTION OF THE INVENTION

In FIG. 1, an active mating connector has been represented, which is an example of a female connection element with which the plug of the invention can interact.

This mating connector is, for example, in accordance with the industrial standard ST of the MIL-C-83522 standard. This mating connector, labelled 100, is in the form of a parallelepipedal plastic casing 101 containing an electrooptical component 102, for example a diode laser or a photodiode. The unit comprises, at the front, for allowing the optical fiber to be received, a tube 103, generally made of metal, whose external cylindrical shape defines an internal housing 104, also cylindrical, connecting with the electrooptical component 102 by a funnel part 105 and a bore 106 of diameter 2.5 mm ending at the inner face 107 of the mating connection. The bore 106 is intended to receive an element of the same cross-section as the plug, ensuring precise guiding of the fiber. This element will be guided for its introduction into the bore 106 by the funnel 105.

The mating connector is furthermore provided with a groove 108 preventing any rotation of the plug when it is introduced into the tube 103, as well as two diametrically opposite studs 109 interacting with corresponding members of the plug.

Most often, these mating connectors are provided with pins 110 allowing direct welding onto a printed circuit board, generally onto an edge part of the latter in order to allow easier insertion and withdrawal of the plugs. However, it is commonly the case that, in this configuration, several mating connectors are juxtaposed against each other and that there is, at the edge of the printed circuit board, an array of very close female plugs, which may be difficult to access because of the presence of the neighboring mating connectors. It will be seen further on that the plug of the invention allows very easy connection/disconnection even in these difficult access situations.

A plug with a fairly complex structure has hitherto been generally used, with a bayonet system or locking ring comprising a neck in the shape of a cam receiving the studs 109.

FIGS. 3 to 7 show the plug according to the invention.

In FIG. 3, the entry of the tube 103 of the mating connector has furthermore been represented, in an intermediate position where the plug is presented in front of the mating connector and introduced a small way into the latter before the start of the final insertion and locking phase.

This plug, denoted by the general reference 200 essentially comprises a central elongate body 210 and two lateral arms 220, whose general position forms with the body 210 a common plane and which will subsequently be called "plane containing the body and the arms as well as the axis A of the fiber", corresponding to the plane of the section in FIG. 3. These arms are each terminated by a respective flange 230 intended for engaging the mating connector with the studs 109 in the manner which will be explained further on.

More precisely, the body 210 has a substantially cylindrical general shape and accommodates the fiber termination comprising, at 211, the fiber coated with its cladding and, at 212, the bare fiber itself. The emerging fiber part labelled 213 is cut after overmolding the plug, the face 219 of the plug is then polished and the endpiece 214 guided by the funnel 105 is centered accurately in the bore 106 of the mating connector (FIG. 2) until the face 219 bears on the internal face 107 of the mating connector, ensuring correct positioning of the fiber facing the lens of the electrooptical component.

The term endpiece will subsequently be used to mean the region 214 of the central body, and therefore of the plug, which is to be inserted into the mating connector and/or the region 215 situated opposite, on the side of the strand 216 of the fiber to be connected.

A peripheral relief 217 may be provided on molding to facilitate the operations of insertion and withdrawal of the plug (in the direction of the arrow A or in the opposite direction), the latter being of very small dimensions.

A guide element 240 is also provided on the central body, which guide element interacts with the notch 108 of the mating connector, intended for the precise angular positioning of the plug in the mating connector (in particular for the flanges to be placed in the direction of these studs) and preventing any subsequent rotation of the plug.

Finally, the central body carries a disk-shaped element 250 whose external diameter is matched to the internal diameter of the cylinder 103 of the mating connector. This element is intended to effect precise guiding of the plug in the cylinder of the mating connector when it is inserted therein.

It is a feature of the invention that two elastically deformable arms 220 are mounted on the central body, these having, over the majority 221 of their length, a flattened form, of for example elongate rectangular cross-section, whose width (corresponding to the plane of the section of FIG. 3) is situated in the same plane as the central body (overall plane), and whose greater length (seen in projection in FIG. 4 on the plane of the figure), is perpendicular to this same plane.

Furthermore, in addition to their flattened shape, the arms are curved as illustrated in FIG. 3, that is to say with their radius of curvature contained in the overall plane and their concavity pointing towards the body. It will be seen further on that this configuration makes it possible to increase the elasticity of the arms in the axial direction, that is to say in the direction of a force tending to bring together the two ends 222 and 223 of the arms.

Each of the arms is fixed by one of its ends, labeled 222, to a region 218 of the central body situated in the rear half thereof, this junction zone producing an elastic hinge effect between the body 210 and the arm 220; the latter may thus be radially separated from the body under the effect of an external stress applied along the arrow B.

The other end 223 of the arms, that is to say their free end, is provided with a flange 230 (seen in greater detail from the front in FIG. 5 and from the side in FIG. 6). Each of these flanges consists of a flattened element of approximately square outline, which is essentially indeformable, extending in a plane perpendicular to the overall plane and parallel to the principal axis A of the plug and of the fiber.

The two flanges are apart from each other by a spacing (distance between their opposite internal faces) substantially corresponding to the diameter of the cylinder 103 of the mating connector, or slightly less, these flanges being intended to be pressed flat against this cylinder and cover, by their cavities 231, the studs 109 after complete insertion of the plug into the mating connector.

More precisely, in order to interact with the respective stud 109 of the mating connector, each of these flanges comprises, on its face turned towards the central body, a cavity 231 which has, at least in part, a section corresponding with that of the studs 109 (that is to say, for example, may have a section at least in part circular, as may be seen in FIG. 6).

The cavity is however open laterally downward at 232 (FIG. 6), this opening out on an open part 233. This configuration has the purpose of allowing possible disengagement of the stud 109 by downward movement of the flanges (arrow E), without radial separation of the latter, that is to say without movement in the direction of the arrow B; the manner in which these movements are made during connection/disconnection operations will be explained further on.

It will furthermore be noted that each of the flanges comprises, at the front part, a beveled face 234, seen in particular in FIG. 3, acting as a ramp and used to force the separation of the flanges (arrow B) when the flanges come into contact with the studs 109 during the pressing of the plug into the mating connector.

The plug unit is advantageously produced in a plastic monobloc form having both good resilience properties and being capable of being molded with high dimensional precision (little shrinkage). A plastic material such as PBT (polybutylene terephthalate), may for example be chosen.

It will be noted that such a plug is generally of very small dimensions, typically with a maximum length of 35 mm for a maximum overall width of 12.7 mm, the diameter of the body being, in its central part, of the order of 3 mm.

Very advantageously, the plug is furthermore made directly by molding over the fiber, in one and the same manufacturing step. Holes for holding the fiber during overmolding (not shown) may then be provided so that the overmolding operations can be carried out with the highest desired precision.

The use of this plug will now be described.

The connection operation is carried out in the most simple manner, by simple insertion of the front zone 214 into the cylinder 103 of the mating connector and exertion of an axial thrust A. The plug can then penetrate into the mating connector where it will be guided axially by the disc 250; when the faces 234 of the flanges come into contact with the studs 109, the flanges are separated from the body (arrow B) until the cavities 231 are situated opposite the studs 109, the flanges will then return to their initial position by virtue of the intrinsic elasticity of the arms 220 acting so as to return the latter toward the central body. The plug is then locked onto the mating connector.

It will be noted that, in this final locked position, the arced shape of the arms makes it possible for them to exert on the body a slight axial pressure force, which makes it possible to ensure, in a precise manner, optimum optical contact between the end 219 of the plug and the lens 107 of the electrooptical component, which function was hitherto delegated to a separate spring in plug connectors of the prior art; as can be seen, in the case of the present invention, it is not necessary to add any special part, this function being incurred by the choice of the actual shape of the arms 220.

Disconnection can be carried out in two different manners.

The first consists simply in separating the two flanges 250 in order to free the studs 109 and withdraw the plug by pulling in the direction opposite to the arrow A (the flanges being separated in the direction of the arrows B).

The other manner consists, instead of acting directly on the flanges and separating them, in lowering them by moving them parallel to their own plane (arrow E) and without separating them radially from the body (that is to say without movement in the direction of the arrows B). This movement can be imparted by exerting a thrust on the central parts of the arms (arrow C in FIG. 4) in order to lower the flanges situated at the ends of these arms.

The studs 109 become laterally freed through the openings 232, from the respective cavities 231 and, once they have reached the open region 233, the plug may be withdrawn without difficulty by pulling backward.

As can be seen, the operations of connection can be carried out by manipulating only the rear part of the plug, and the operations of disconnection can be carried out by simple vertical pressing on the front part then manipulation of the rear part. This is particularly advantageous in the case when there are a large number of juxtaposed mating connectors which are furthermore fixed against a printed circuit board. This last configuration actually leaves only very little range of maneuvering for manipulating the plugs, especially considering their very small dimensions.

We claim:

1. A fiber-optic plug connector (200) comprising:

an elongate central body (210) accommodating a fiber termination (211, 212) with a cylindrical region (250), and two elastically deformable arced shape arms (220), each connected by one (222) of their ends to a rear region (218) of the central body and extending in their entirety along the central body, substantially parallel to the general axis of the central body, the arms each having an arced shape over a majority of their lengths, the free end (223) of each arm each carrying a flange (230) provided, on its face turned toward the central body, with a cavity (231), wherein the central body and arced shape arms are parts of a monobloc plug body.

2. The plug as claimed in claim 1, wherein the cavity (231) is open laterally (232, 233) in a direction approximately perpendicular to the overall plane containing the central body and the arms.

3. The plug as claimed in claim 2, wherein the arms have, with respect to their point of junction to the central body, a greater elasticity in the direction of a radial separation in said overall plane than in a direction perpendicular to this plane.

4. The plug as claimed in claim 1, wherein all the parts constituting the plug constitute a molded monobloc unit.

5. The plug as claimed in claim 4, wherein the monobloc unit is molded over the fiber termination.

6. A fiber-optic plug connector (200) having means adapted to interact with a mating connector (100) or other female connection element comprising a tubular housing (103) receiving the fiber termination and provided with two diametrically opposite peripheral studs (109) interacting with corresponding members of the plug in order to allow engaging and locking of the latter onto the mating connector, which plug comprises a plug body having:

an elongate central body (210) accommodating the fiber termination (211, 212) with a cylindrical region (250) whose external section is suitable sized and shaped to be inserted in an internal section of the tubular housing of the mating connector, and two elastically deformable arms (220), each connected by one (222) of their ends to a rear region (218) of the central body and extending in their entirety along the central body substantially parallel to the general axis of the central body for connection to the respective studs of the mating connector, a free end (223) of each arm each carrying a flange (230) provided, on its face turned toward the central body, with a cavity (231) of cross-section at least partially suitably sized and shaped to receive the external section of the respective stud of the mating connector, wherein the central body and arms are integrally formed as a monobloc plug body and the elastic deformation of the arms is such that, after insertion and engaging of the plug in the mating connector, the arms exert by reaction on the central body an axial farce holding the terminal end of the fiber (213) in pressure against a corresponding optical element (107) of the mating connector.

7. The plug as claimed in claim 6 wherein the cavity (231) is open laterally (232, 233) in a direction approximately perpendicular to the overall plane containing the central body and the arms.

8. The plug as claimed in claim 7, wherein the arms have, with respect to their point of junction to the central body, a greater elasticity in the direction of a radial separation in said overall plane than in a direction perpendicular to this plane.

9. The plug as claimed in claim 6, wherein the arms (220) have an arced shape along a majority of their lengths to exert said axial force.

10. The plug as claimed in claim 6, wherein all the parts constituting the plug constitute a molded monobloc unit.

11. The plug as claimed in claim 10, wherein the monobloc unit is molded over the fiber termination.

12. A fiber-optic plug connector comprising:

an elongate central body accommodating a fiber termination; and two deformable arms integral with the central body having first ends connected to the central body and second free ends for connection to a mating connector, the second free ends having a flange with a cavity, each cavity being laterally open in a direction generally perpendicular to an overall plane containing the central body and arms, and inwardly open in a direction towards the central body, the arms being elastically deflectable to move the flanges either radially outward in the plane or generally perpendicular to the plane for removing engagement of the flanges with a portion of the mating connector, wherein each of the arms has an arced shape along a majority of its length.

13. A fiber-optic connector comprising:

a central body accommodating a termination of an optical fiber; and two elastically deformable arms integrally formed with the central body, each arm having a free end adapted to interlock with a portion of a mating connector, wherein the arms are suitably sized and shaped with an arced shape along a majority of their lengths such that, when connected to the mating connector, the arms exert a force on the central body and the mating connector to axially press an end of the fiber in the central body against a corresponding optical element of the mating connector.

* * * * *